(12) United States Patent
Nguyen et al.

(10) Patent No.: US 6,996,736 B1
(45) Date of Patent: Feb. 7, 2006

(54) PROGRAMMABLE CLOCK NETWORK FOR DISTRIBUTING CLOCK SIGNALS TO AND BETWEEN FIRST AND SECOND SECTIONS OF AN INTEGRATED CIRCUIT

(75) Inventors: Triet Nguyen, San Jose, CA (US); David Jefferson, Morgan Hill, CA (US); Srinivas Reddy, Fremont, CA (US); Keone Streicher, San Jose, CA (US)

(73) Assignee: Altera Corporation, San Jose, CA (US)

( * ) Notice: Subject to any disclaimer, the term of this patent is extended or adjusted under 35 U.S.C. 154(b) by 498 days.

(21) Appl. No.: 10/076,172

(22) Filed: Feb. 12, 2002

Related U.S. Application Data (60) Provisional application No. 60/289,244, filed on May 6, 2001.

(51) Int. Cl.
*G06F 1/10* (2006.01)
(52) U.S. Cl. ............................ 713/500; 326/39; 326/93
(58) Field of Classification Search .................. 326/39, 326/93; 713/500
See application file for complete search history.

(56) References Cited

U.S. PATENT DOCUMENTS

| | | | |
|---|---|---|---|
| 4,912,342 A | 3/1990 | Wong et al. | |
| 5,686,844 A * | 11/1997 | Hull et al. | ..................... 326/38 |
| 5,712,579 A * | 1/1998 | Duong et al. | .................. 326/93 |
| 5,744,991 A | 4/1998 | Jefferson et al. | |
| 6,127,865 A | 10/2000 | Jefferson | |
| 6,191,609 B1 * | 2/2001 | Chan et al. | ................... 326/38 |
| 6,249,149 B1 | 6/2001 | Pedersen | |

* cited by examiner

*Primary Examiner*—Thomas Lee
*Assistant Examiner*—Albert Wang
(74) *Attorney, Agent, or Firm*—Townsend and Townsend and Crew LLP (57) ABSTRACT

A clock network for an integrated circuits includes a first set of lines configured to distribute clock signals to a first section of the integrated circuit. The clock network also includes a second set of lines configured to distribute clock signals to a second section of the integrated circuit separately from the first section of the integrated circuit.

17 Claims, 7 Drawing Sheets

PROGRAMMABLE CLOCK NETWORK FOR DISTRIBUTING CLOCK SIGNALS TO AND BETWEEN FIRST AND SECOND SECTIONS OF AN INTEGRATED CIRCUIT

CROSS REFERENCE TO RELATED APPLICATIONS

The present application claims the benefit of earlier filed provisional application U.S. Ser. No. 60/289,244, entitled HIGH SPEED PROGRAMMABLE CLOCK TREE, filed on May 6, 2001, the entire content of which is incorporated herein by reference.

BACKGROUND

1. Field of the Invention

The present invention generally relates to clock networks, and more particularly to clock networks for integrated circuits.

2. Description of the Related Art

Clock networks, which are also known as clock trees, are used in integrated circuits to distribute clock signals. More particularly, in conventional clock networks, input-clock signals are received through dedicated clock-input pins. The clock signals are then distributed throughout the integrated circuit using a network of lines and drivers. Conventional clock networks also typically include multiple layers of buffers to reduce clock skew.

One shortcoming of conventional clock networks is that clock signals are distributed to all areas of an integrated circuit, even those that may not need to receive the clock signals. This can result in inefficient and undesirable use of power as clock networks are typically one of the most-demanding components of integrated circuits.

Another shortcoming of conventional clock networks is that input-clock signals are only received through dedicated clock-input pins. This limits both the number and type of clock signals that can be carried by the clock network.

SUMMARY

The present invention relates to a clock network for integrated circuits. In accordance with one aspect of the present invention, the clock network includes a first set of lines configured to distribute clock signals to a first section of the integrated circuit. The clock network also includes a second set of lines configured to distribute clock signals to a second section of the integrated circuit separately from the first section of the integrated circuit. In accordance with another aspect of the present invention, the clock network can receive input-clock signals from input pins on the integrated circuit that are not designated input-clock pins.

DESCRIPTION OF THE DRAWING FIGS

The present invention can be best understood by reference to the following description taken in conjunction with the accompanying drawing figures, in which like parts may be referred to by like numerals.

DETAILED DESCRIPTION

In order to provide a more thorough understanding of the present invention, the following description sets forth numerous specific details, such as specific configurations, parameters, and the like. It should be recognized, however, that such description is not intended as a limitation on the scope of the present invention, but is intended to provide a better description of exemplary embodiments.

Figure 1:
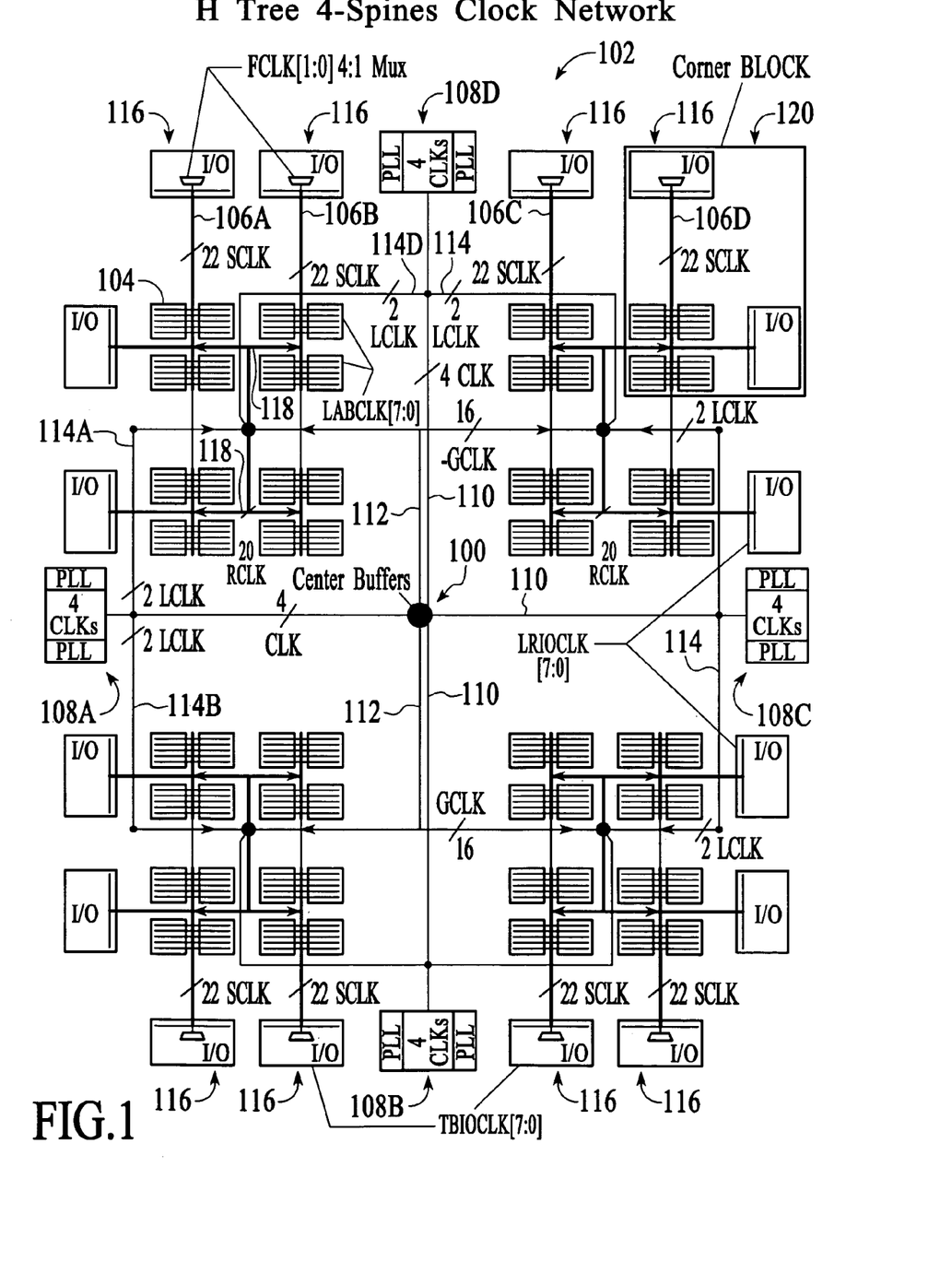
FIG. 1 is a simplified block diagram of an exemplary clock network embodied within a programmable logic device (PLD)

With reference to FIG. 1, in one exemplary embodiment of the present invention, a clock network 100 is depicted as embodied within a programmable logic device (PLD) 102. Although the following description describes clock network 100 with respect to its use in PLD 102, it should be recognized that clock network 100 can be used in any integrated circuit.

As depicted in FIG. 1, PLD 100 includes sets of logic array blocks (LABs) 104, which are grouped sets of programmable logic resources. More particularly, with reference to FIG. 3, each set of LABs 104 includes a plurality of logic array blocks (LABs) 302 that have logic elements that can be configured or programmed to perform logical functions, such as AND, OR, NOT, XOR, NAND, NOR, and the like.

With reference again to FIG. 1, it should be recognized that PLD 102 can include any number of programmable logic resources arranged in various configurations with an interconnect structure. Furthermore, PLD 102 can be known by various names or terms, such as PAL, PLA, FPLA, EPLD, CPLD, EEPLD, LCA, FPGA, and the like. Additionally, PLD 102 can be a component of various electronic systems, such as a PDA, cell phone, and the like.

As will be described in greater detail below, clock network 100 includes a plurality of signal paths, also referred to as lines, that distribute signals to various regions of PLD 102. More particularly, in the present embodiment, clock network 100 includes spine lines 106, input-clock lines 110, global-clock lines 112, local-clock lines 114, and regional-clock lines 118. It should be recognized, however, that clock network 100 can include any number and types of lines arranged in various configurations.

As depicted in FIG. 1, clock network 100 can be segmented into a number of regions. More particularly, in the present embodiment, PLD 102 and clock network 100 are segmented into quadrants. Although four quadrants are depicted and described below, it should be recognized that PLD 102 and clock network 100 can be segmented into any number of regions.

As will be described below, clock network 100 can distribute various types of signals selectively to different regions of PLD 102. More particularly, clock network 100 can distribute a signal that is common to all of the regions of PLD 102 (a global signal); a signal that is specific to one or more regions (a local signal), a signal distributed within a specific region (a regional signal), and a signal that is specific to a portion of one region (a local signal). It should be recognized that the names for these different types of signals are somewhat arbitrary and that various other names can be used.

One type of signals that can be distributed through clock network 100 are clock signals. In the present embodiment, clock network 100 can distribute global-clock signals, regional-clock signals, local-clock signals, and fast-clock signals. The global-clock signals can be distributed to all regions of PLD 102 through global-clock lines 112. The local-clock signals can be distributed to one or more regions of PLD 102 through local-clock lines 114. The regional-clock signals can be distributed within a region of PLD 102 through regional-clock lines 118. The fast-clock signals can be distributed to a particular area within a region of PLD 102 through spine lines 106. In this manner, a wide selection of clock signals can be provided to different areas or regions of PLD 102. Additionally, different areas or regions of PLD 102 can be selectively provided with clock signals. As such, a specific area or region of PLD 102 can be provided with clock signals without having to provide all area or regions of PLD 102 with clock signals, which has the advantage of reducing the amount of power consumed.

As also described below, another type of signals that can be distributed through clock network 100 are general-purpose routing signals. One advantage to using clock network 100 for distributing general-purpose routing signals is that clock network 100 may typically have less loading than the routing lines of PLD 102. Additionally, clock network 100 may typically have wider line widths than the routing lines of PLD 102. Furthermore, clock network 100 may typically have less skew and delay than the routing lines of PLD 102.

Global Clocks

As mentioned above, clock network 100 can be used to distribute global-clock signals to the various regions of PLD 102. In the present embodiment, global-clock signals are generated from a plurality of input-clock signals.

More particularly, as depicted in FIG. 1, a plurality of input-clock signals are brought from input-clock blocks 108 to the center of the core of PLD 102 through input-clock lines 110. In the present embodiment, each input-clock block 108 includes four input clocks. More particularly, input-clock block 108A includes input-clock signals CLK0, CLK1, CLK2, CLK3. Input-clock block 108B includes input-clock signals CLK4, CLK5, CLK6, and CLK7. Input-clock block 108C includes input-clock signals CLK8, CLK9, CLK10, and CLK11. Input-clock block 108D includes input-clock signals CLK12, CLK13, CLK14, and CLK15. As such, at the center of PLD102, a total of 16 input-clock signals converge. It should be recognized, however, that clock network 100 can include any number of input-clock signals and any number of input-clock blocks arranged in any number of configurations.

Figure 5:
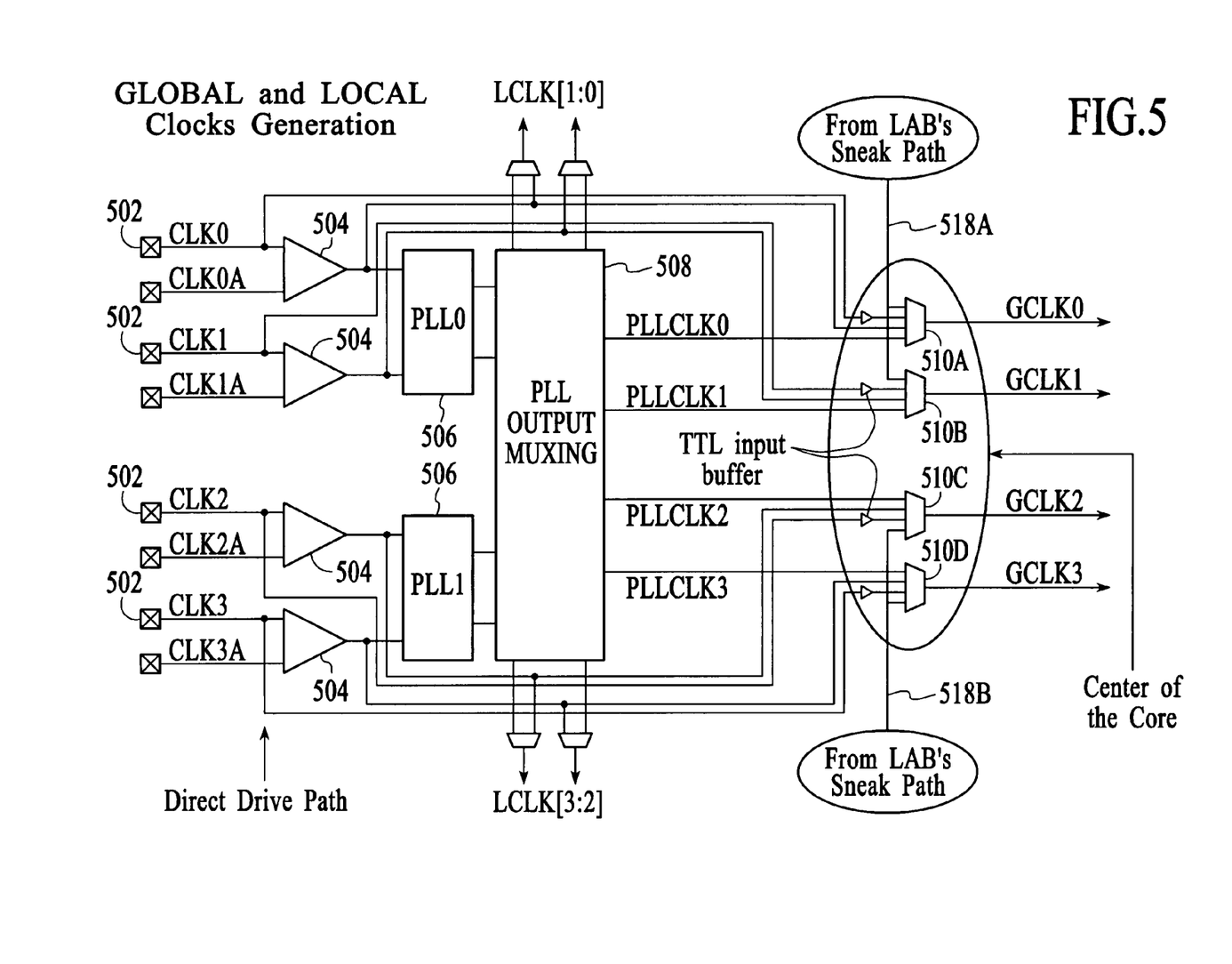
FIG. 5 is a schematic of a portion of the block diagram depicted in FIG. 1.

In FIG. 5, input-clock block 108A (FIG. 1) is depicted in more detail. As depicted in FIG. 5, in the present embodiment, input-clock signals CLK0, CLK1, CLK2, and CLK3 are brought from their dedicated input pins 502 to the center of the core of PLD 102 (FIG. 1). As also depicted in FIG. 5, a number of different clock signals can be generated from the input-clock signals. More particularly, PLL-clock signals (i.e., PLLCLK0, PLLCLK1, PLLCLK2, and PLLCLK3) are generated from the input-clock signals by passing each input-clock signal through a differential buffer 504, a PLL 506, and PLL Output Muxing Block 508. Buffer-clock signals are generated from the input-clock signals by passing each input-clock signal through a differential buffer 504. Direct-clock signals are generated directly from each input-clock signal.

Figure 7:
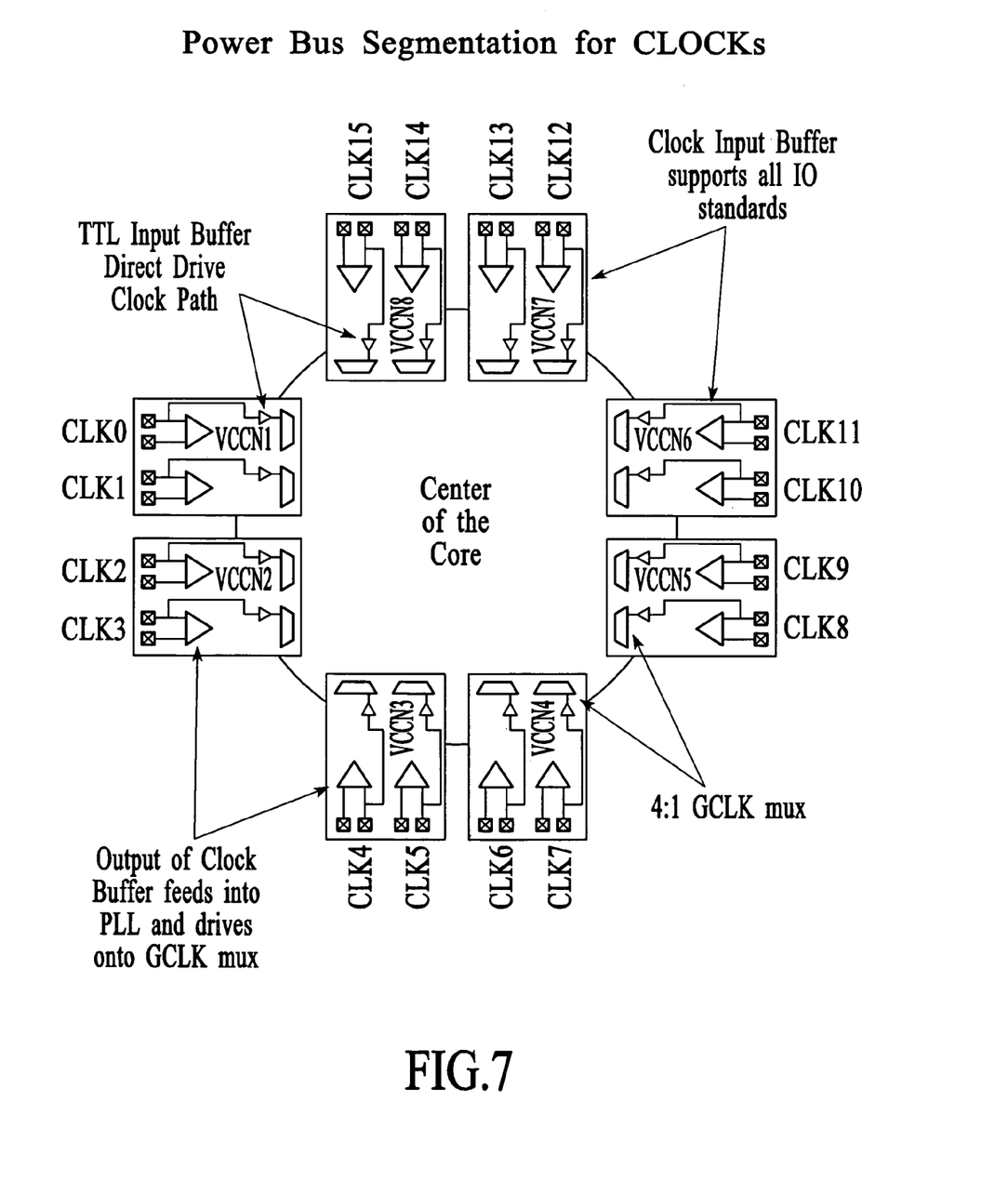
FIG. 7 is a block diagram of another portion of the block diagram depicted in FIG. 1.

With reference to FIG. 7, a power bus is assigned to the input-clock signals. More particularly, in the present embodiment, eight power buses (i.e., VCCN1, VCCN2, VCCN3, VCCN4, VCCN5, VCCN6, VCCN7, and VCCN8) are brought into the center of the core. One power bus is assigned to a pair of input-clock signals. VCCN1 is assigned to input-clock signals CLK0 and CLK1. VCCN2 is assigned to CLK2 and CLK3. VCCN3 is assigned to input-clock signals CLK4 and CLK5. VCCN4 is assigned to input-clock signals CLK6 and CLK7. VCCN5 is assigned to input-clock signals CLK8 and CLK9. VCCN6 is assigned to input-clock signals CLK10 and CLK11. VCCN7 is assigned to input-clock signals CLK12 and CLK13. VCCN8 is assigned to input-clock signals CLK14 and CLK15. It should be noted that any number of power buses can be used and can be assigned to the various input-clock signals in any number of configurations.

Figure 3:
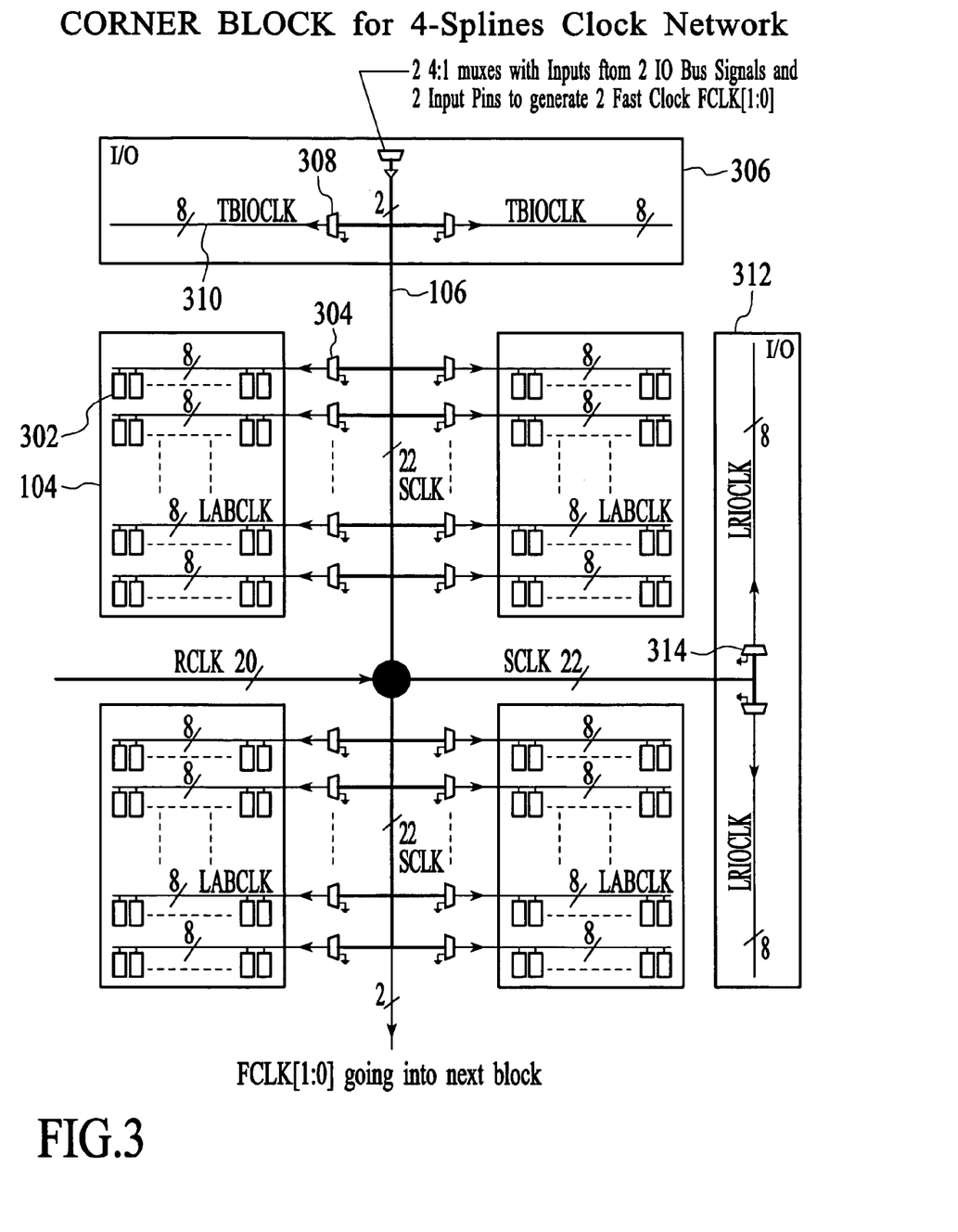
FIG. 3 is a portion of the block diagram depicted in FIG. 1.

With reference again to FIG. 5, in addition to receiving input-clock signals through dedicated input pins 502, clock network 100 (FIG. 1) can be configured to receive input-clock signals from the logic resources of PLD 102 (FIG. 1). More particularly, in the present embodiment, a set of input-clock signals can be received through a sneak path from LABs 302 (FIG. 3). As such, the number of input-clock signals is not limited by the number of dedicated input pins 502.

Figure 6:
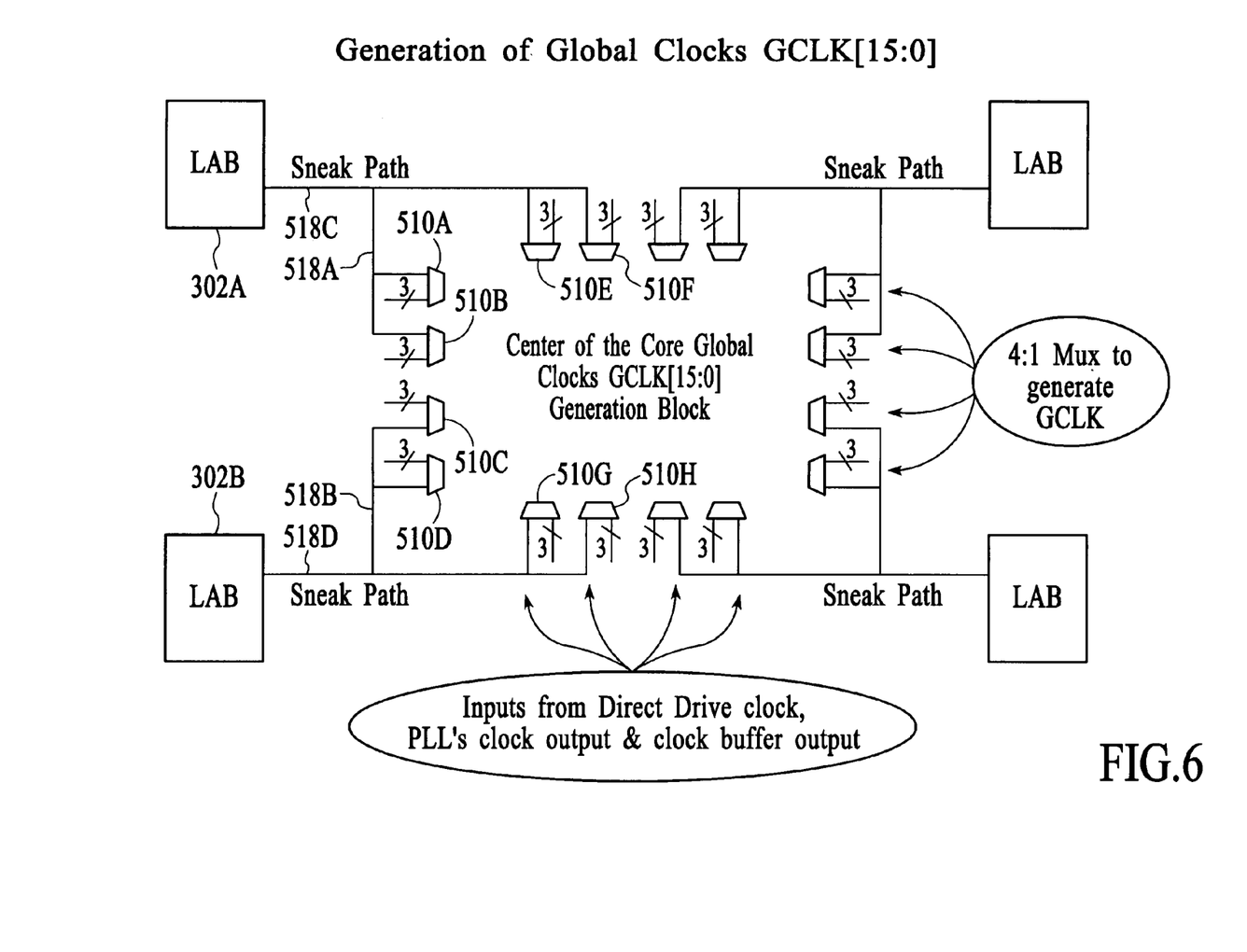
FIG. 6 is a block diagram of a portion of the block diagram depicted in FIG. 1.

As depicted in FIG. 5, the various input-clock signals are multiplexed together using muxes 510. In the present embodiment, each mux 510 is a 4:1 mux that has as inputs a PLL-clock signal, a buffer-clock signal, and a direct-clock signal from dedicated input pins 502 of input-clock signals CLK0, CLK1, CLK2, and CLK3. Additionally, each mux 510 has as an input a sneak path 518 from a LAB 302 (FIG. 3). More particularly, as depicted in FIG. 6, LAB 302 A is connected through sneak path 518A to muxes 510A and 510B and sneak path 518C to muxes 510E and 51° F. LAB 302B is connected through sneak path 518B to muxes 510C and 510D and sneak path 518D to muxes 510G and 510H. In the present embodiment, muxes 510A, 510B, 510C, and 510 D are connected to input-clock block 108A. Muxes 510E and 510F are connected to input-clock block 108D (FIG. 1). Muxes 510G and 510H are connected to input-clock block 108B (FIG. 1). It should be recognized that any number of LABs 302 can be connected to any number of muxes 510 in any number of configurations. It should also be recognized that the number of input clock signals and thus the number of inputs of muxes 510 can vary.

With reference again to FIG. 5, global-clock signals GCLK0, GCLK1, GCLK2, and GCLK3 can be generated and selected from any of the various input-clock signals. With reference again to FIG. 5, in the present embodiment, a total of 16 global-clock signals are generated. It should be recognized, however, that any number of global-clock signals can be generated from any number of inputs from various types of sources.

With reference again to FIG. 1, the global-clock signals are distributed through global-clock lines 112. In the present embodiment, 16 global-clock signals are distributed to each region of PLD 102. It should be recognized, however, that any number of global-clock signals can be distributed to each region. Furthermore, different numbers of global-clock signals can be distributed to each region.

Local Clocks

As depicted in FIG. 5, in the present embodiment, local-clock signals are also generated from the input-clock signals. More particularly, the output of a differential buffer 504 and the output of PLL Output Muxing Block 508 can be multiplexed together to generate a local-clock signal. Two local-clock signals are generated for each region from the input-clock signals and PLLs closes to that region. For example, in FIG. 5, local-clock signals LCLK0 and LCLK1 are generated from input-clock signals CLK0, CLK1, and PLL0. Local-clock signals LCLK2 and LCLK3 are generated from input-clock signals CLK2, CLK3, and PLL1.

As depicted in FIG. 1, local-clock signals LCLKO and LCLK1 (FIG. 5) are distributed to the center of the upper left region of PLD 102 along local-clock line 114A. Local-clock signals LCLK2 and LCLK3 are distributed to the center of the lower left region of PLD 102 along local-clock line 114B. As further depicted in FIG. 1, two more local-clock signals are distributed from input-clock block 108D to the upper left region of PLD 102 along local-clock line 114D. As such, four local-clock signals converge at the center of each region of PLD 102. It should be recognized, however, that any number of local-clock signals can converge at each region of PLD 102.

As depicted in FIG. 1, each region of PLD 102 can be provided with different local-clock signals. As such, each region can be provided with a wide selection of clock signals. Additionally, clock signals can be provided selectively to certain regions using the local-clock lines 114 for those regions without using the global clock network. As such, power consumption can be reduced by not using the global-clock lines and bus.

Regional Clocks

In each region of PLD 102, local-clock signals and global-clock signals converge to form regional-clock signals. In the present embodiment, four local-clock signals and sixteen global-clock signals meet at the center of each region. For example, at the center of the upper left region of PLD 102, two local-clock signals from input-clock block 108A converge with two local-clock signals from input-clock block 108D. Sixteen global-clock signals from the center of PLD 102 converge with these four local-clock signals to form regional-clock signals for this region of PLD 102. It should be recognized, however, that the regional-clock signals can include any number and type of clock signals.

The regional-clock signals are then distributed within each region of PLD 102 through regional-clock lines 118. In the present embodiment, regional-clock lines 118 connect to spine lines 106, which are connected to sets of LABs 104. As such, the regional-clock signals can be distributed to sets of LABs 104 through regional-clock lines 118 and spine lines 106. It should be recognized, however, that regional-clock lines 118 can be connected directly to sets of LABs 104.

Fast Clocks

As depicted in FIG. 1, fast-clock signals can be generated at input/output (I/O) blocks 116. In the present embodiment, two fast-clock signals are generated in two 4:1 muxes. The inputs to each mux are two I/O bus signals and two I/O pin signals. Thus, each mux can select which I/O bus signal or I/O pin signal to use as the fast-clock signal. It should be recognized, however, that any number of fast-clock signals can be generated.

As depicted in FIG. 1, fast-clock signals can be distributed into a region more directly than local-clock signals or global-clock signals. As also depicted in FIG. 1, different fast-clock signals can be provided to different areas of a region. As such, clock signals can be provided to certain areas of a region using the fast-clock signals for those areas without using the local or global clock network. As such, power consumption can be reduced by not using the local or global clock lines and buses. Additionally, fast-clock signals can be provided to an area of a region more directly and quickly than using local-clock signals or global-clock signals. Furthermore, the number of input-clocks signals is not limited by the dedicated input pins.

Spine Lines

As depicted in FIG. 1, the regional-clock signals converge with the fast-clock signals to form spine-clock signals. More particularly, two fast-clock signals from each I/O block 116 converge with twenty regional-clock signals (i.e., sixteen global-clock signals and four local-clock signals) to form twenty-two spine-clock signals.

The spine-clock signals are distributed through spine lines 106. In the present embodiment, each region of PLD 102 includes two spine lines 106. For example, the upper left region of PLD 102 includes spine lines 106A and 106B, each spine line carrying twenty-two spine-clock signals. It should be recognized, however, that clock network 100 can include any number of spine lines 106 that carry any number of spine-clock signals.

Additionally, spine lines 106 can be configured as diffusion columns running from top to the bottom of the core. Furthermore, clock related drivers and buffers, with the exception of the drivers at the center of the core, can be placed in a clock-spine region. More particularly, in the present embodiment, the drivers and buffers for the local-clock signals and the global-clock signals, again with the exception of those at the center of the core, are placed in a clock-spine region. In this manner, any interface to the rest of the chip layout by clock network 100 can be reduced. Additionally, these drivers and buffers can be configured and tuned to reduce skew and delay.

Thus far, spine-clock signals and spine lines 106 have been described as including and carrying global-clock signals, local-clock signals, regional-clock signals, and fast-clock signals. In this manner, a wide selection of clock signals can be provided throughout clock network 100. It should be recognized, however, that spine-clock signals and spine lines 106 can include and carry any combination of clock signals. For example, spine-clock signals and spine lines 106 can include and carry just global-clock signals and local-clock signals. Alternatively, in some applications, spine-clock signals and spine lines 106 can include and carry just one type of clock signal. Thus, in this manner, the configuration of the spine-clock signals and spine lines 106 is flexible and can be altered depending on the application.

Labs

As described earlier, with reference to FIG. 1, PLD 102 includes a plurality of sets of LABs 104. As depicted in FIG. 1 and described earlier, in the present embodiment, spine lines 106 are disposed between columns of sets of LABs 104 to provide a wide selection of clock signals to each set of LABs 104. More particuarly, in FIG. 1, four spine lines 106 (i.e., spine lines 106A, 106B, 106C, and 106D) are disposed between 8 columns of sets of LABs 104, with each set of LABs 104 adjacent to and connected to a spine line 106. It should be recognized, however, that clock network 100 can include any number of spine lines 106 adjacent any number of columns of sets of LABs 104.

Section 120 of PLD 102 is depicted in greater detail in FIG. 3. As described earlier, with reference now to FIG. 3, each set of LABs 104 can include a number of LABs 302 arranged in any number of rows. As depicted in FIG. 3, in the present embodiment, each row of LABs 302 is connected to a spline line 106.

As also depicted in FIG. 3, spine line 106 is connected to a mux 304 that generates a LAB-clock signal. More particularly, each row of LABs 302 include eight 22:1 muxes with each mux connected to spine line 106 to have access to twenty-two spine-clock signals (i.e., 16 global-clock signals, 4 local-clock signals, and 2 fast-clock signals). As such, each row of LABs 302 includes eight LAB-clock signals.

At each LAB 302, the eight LAB-clock signals are multiplexed into two local-LAB clocks. In this manner, a wide selection of clock signals can be provided to LAB 302.

I/Os

As depicted in FIG. 3, spine-clock signals can be provided to I/O decoders. More particularly, in a top or bottom I/O decoder 306, spine line 106 is connected to a mux 308 that generates a top or bottom I/O clock (TBIOCLK) signal. More particularly, eight 22:1 muxes are utilized to generate 8 TBIOCLK signals on a TBLIOCLK line 310. Similarly, in a left or right I/O decoder 312, spine line 106 is connected to a mux 314 that generates a left or right I/O clock (LRIOCLK) signal. Additionally, the TBIOCLK or LRIOCLK signals can be muxed into one local-IO clock signal for each I/O register.

Memory Devices

As noted earlier, clock network 100 described above can be used in various devices. For example, the PLD depicted in FIG. 1 can include memory devices in addition to LABs 302 (FIG. 3). These memory devices can be provided with clock signals similar to the manner in which LABs 302 (FIG. 3) are provided with LAB-clock signals. For example, the 8 LAB-clocks signals can be multiplexed into 2 Local-memory clock signals for each memory device.

General Purpose Routing

As noted earlier, clock network 100 described above can be used for general purpose routing. As also described earlier, fast-clock signals can include inputs from I/O buses and I/O pins. Additionally, the input clock buffers of clock network 100 can support all I/O standards. As such, these inputs can be used for general purpose routing in addition to providing clock signals.

Additionally, as noted earlier, the use of clock network 100 for general purpose routing can be advantageous in that clock network 100 can have less loading than the general routing network. Additionally, the line widths for clock network 100 can be larger than that of the general routing network. Furthermore, clock network 100 can have less skew and delay than the general routing network.

Figure 2:
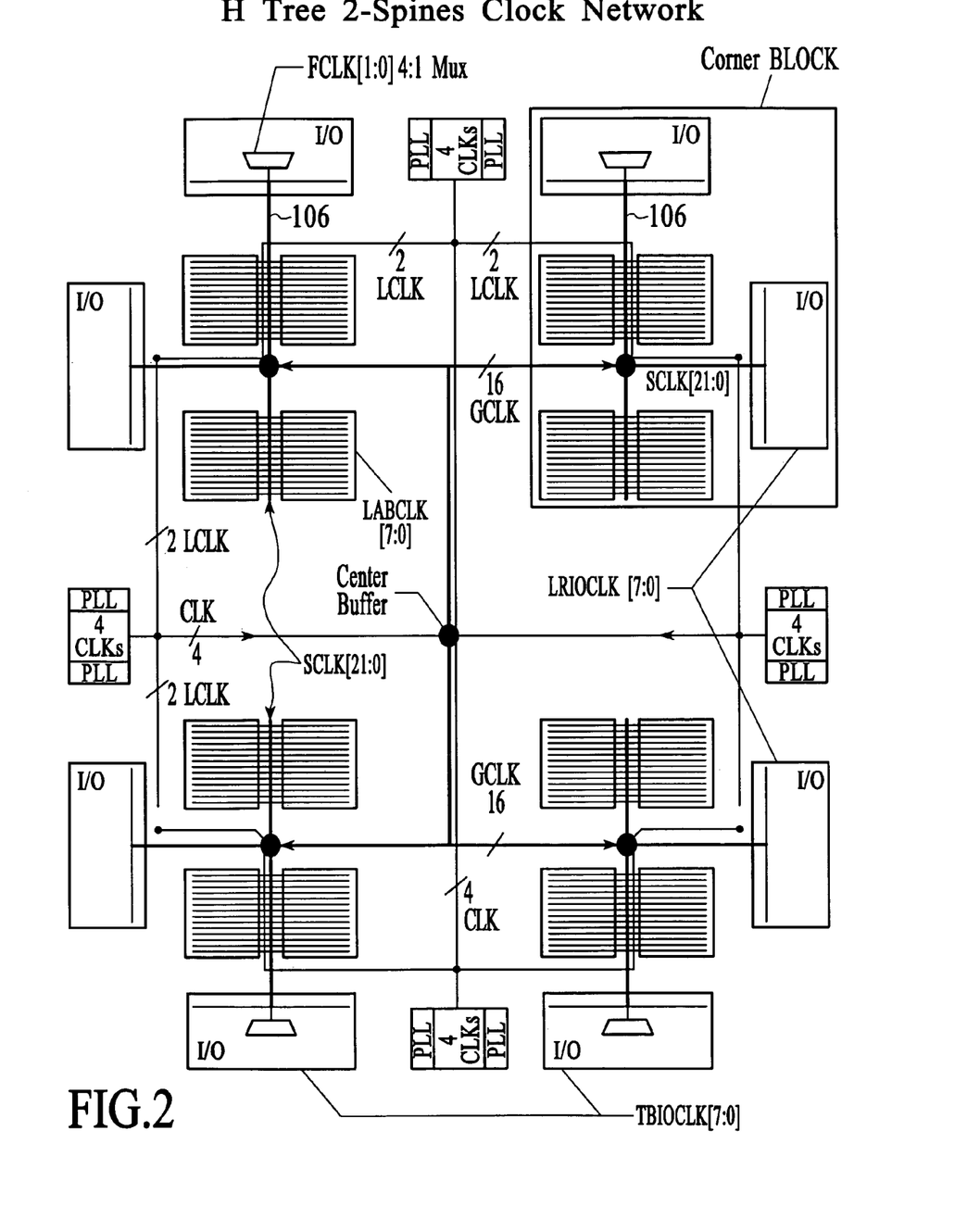
FIG. 2 is a simplified block diagram of another exemplary clock network embodied within a PLD.
Figure 4:
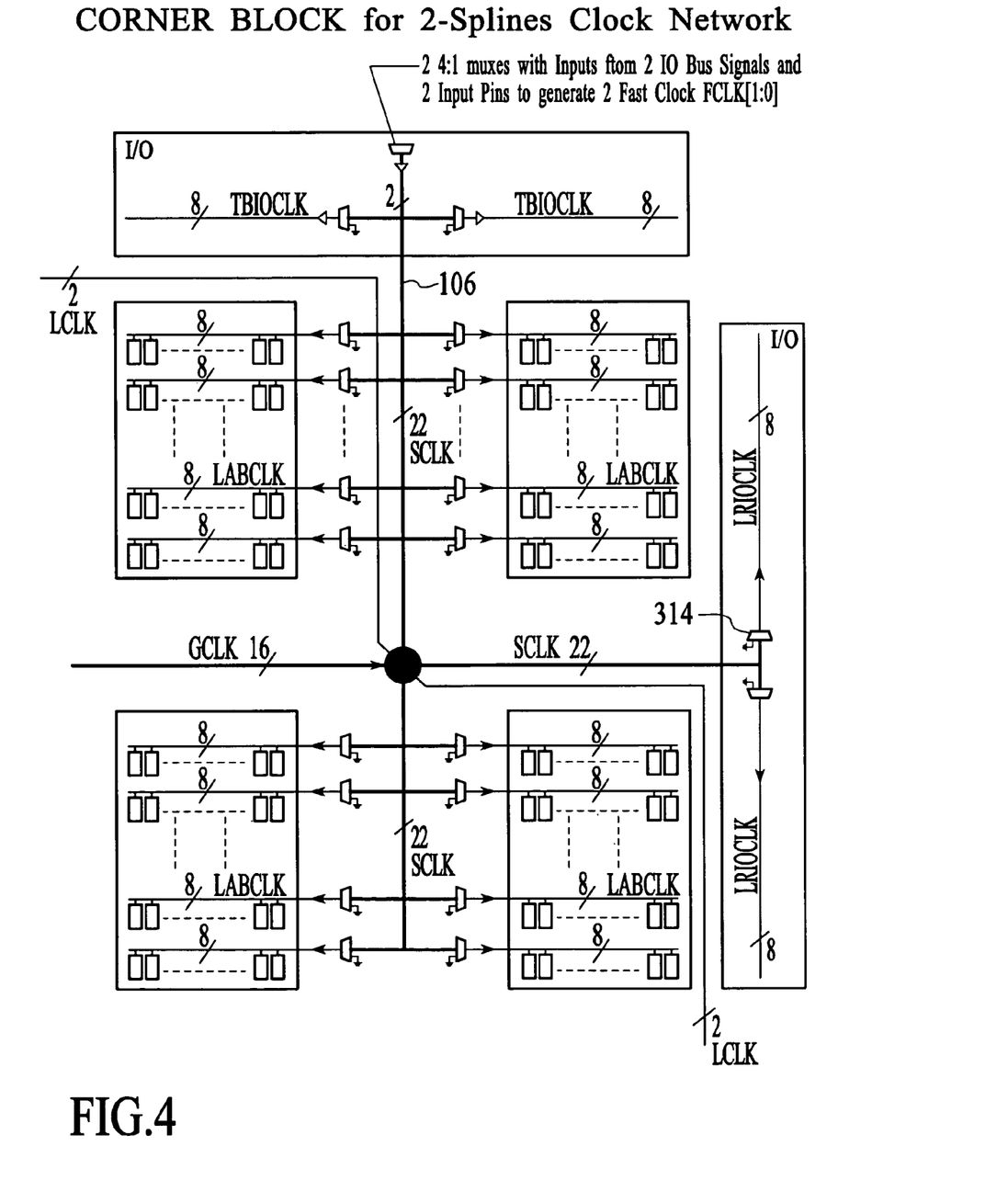
FIG. 4 is a portion of the block diagram depicted in FIG. 2.

Although the present invention has been described in conjunction with particular embodiments illustrated in the appended drawing figures, various modifications can be made without departing from the spirit and scope of the invention. For example, in FIGS. 2 and 4, a clock network with 2 spine lines 106 is depicted. Therefore, the present invention should not be construed as limited to the specific forms shown in the drawings and described above.

We claim:

1. A clock network for an integrated circuit comprising:
a first set of lines configured to distribute clock signals to a first section of the integrated circuit;
a second set of lines configured to distribute clock signals to a second section of the integrated circuit separately from the first section of the integrated circuit;
a third set of lines configured to distribute clock signals to both the first and second sections of the integrated circuit, wherein the third set of lines connects with the second set of lines in the second section of the integrated circuit;
at least one line disposed in the first section connected directly to an input/output (I/O) of the integrated circuit, wherein the at least one line is configured to distribute a clock signal received from the I/O to the first section; and
at least one line disposed in the second section connected directly to an I/O of the integrated circuit, wherein the at least one line is configured to distribute a clock signal received from the I/O to the second section.

2. The clock network of claim 1, wherein:
the at least one line disposed in the first section is connected to the first and third sets of lines; and
the at least one line disposed in the second section is connected to the second and third sets of lines.

3. The clock network of claim 2, wherein the first and third sets of lines converge at the center of the first section, and wherein the second and third sets of lines converge at the center of the second section.

4. The clock network of claim 3, wherein the integrated circuit includes a plurality of logic resources, wherein the at least one line in the first section connects to the plurality of logic resources in the first section, and wherein the at least one line in the second section connects to the plurality of logic resources in the second section.

5. The clock network of claim 1, wherein the integrated circuit includes a plurality of logic resources, and wherein the third set of lines is configured to receive an input-clock signal from at least one logic resource.

6. The clock network of claim 5, wherein the third set of lines is connected to a sneak path from the at least one logic resource.

7. The clock network of claim 5, wherein the third set of lines is configured to receive an input-clock signal from a dedicated input-clock pin.

8. The clock network of claim 7 further comprising:
at least one differential buffer connected to the dedicated input-clock pin;
at least one phase-lock loop connected to the differential buffer;
a phase-lock loop output multiplexing block connected to the phase-lock loop; and
at least one multiplexer having:
a first input connected directly to the dedicated input-clock pin,
a second input connected directly to the output of the differential buffer,
a third input connected to the output of the phase-lock loop output multiplexing block, and a fourth input connected to a sneak path from the at least one logic resource.

9. A clock network for a programmable logic device (PLD), wherein the PLD includes a first set of logic resources and at least a second set of logic resources, the clock network comprising:
  a first set of clock lines configured to distribute clock signals to the first set of logic resources separately from the second set of logic resources;
  a second set of clock lines configured to distribute clock signals to the second set of logic resources separately from the first set of logic resources;
  a third set of clock lines configured to distribute clock signals to both the first and second sets of logic resources, wherein the third set of clock lines connects with the first set of clock lines, and wherein the third set of clock lines connects with the of clock lines;
  at least one clock line connected directly to an input/output (I/O) of the PLD and configured to receive an input-clock signal and distribute the input-clock signal to the first set of logic resources; and
  at least one clock line connected directly to an I/O of the PLD and configured to receive an input-clock signal and distribute the input-clock signal to the second set of logic resources.

10. The clock network of claim 9, wherein the third set of clock lines receives an input-clock signal from a sneak path of at least one logic resource.

11. The clock network of claim 10, wherein the third set of clock lines receives an input-clock signal from a dedicated input-clock pin.

12. The clock network of claim 11, wherein the third set of clock lines is connected to at least one multiplexer having at least one input connected to the dedicated input-clock pin and at least one input connected to the sneak path of logic resource.

13. The clock network of claim 9 further comprising:
  a first central line that connects to the first and third sets of clock lines and to each logic resource in the first set of logic resources; and
  a second central line that connects to the second and third sets of clock lines and to each logic resource in the second set of logic resources.

14. The clock network of claim 13, where the first and second central lines receive input-clock signals from input pins of the PLD that are not dedicated as input-clock pins.

15. A method for distributing clock signals within an integrated circuit using a clock network comprising:
  distributing clock signals to a first section of the integrated circuit using a first set of lines of the clock network;
  distributing clock signals to both the first and second sections of the integrated circuit through a third set of lines of the clock network, wherein the third set of lines connects with the first set of lines in the first section of the integrated circuit, and wherein the third set of lines connects with the second set of lines in the second section of the integrated circuit;
  distributing a clock signal to the first section through at least one line disposed in the first section connected directly to an input-out (I/O) of the integrated circuit; and
  distributing a clock signal to the second section through at least one line disposed in the second section connected directly to the I/O of the integrated circuit.

16. The method of claim 15 further comprising:
  receiving input-clock signals from a logic resource on the integrated circuit.

17. The method of claim 15 further comprising:
  receiving input-clock signals from input pins on the integrated circuit that are not dedicated as input-clock pins.

* * * * *